United States Patent [19]

Hedgcoth

[11] Patent Number: 4,958,066
[45] Date of Patent: Sep. 18, 1990

[54] FINANCIAL INSTRUMENT VERIFICATION AND METHOD OF PRODUCTION

[75] Inventor: Virgle L. Hedgcoth, Pomona, Calif.

[73] Assignee: Secured Transactions, Pomona, Calif.

[21] Appl. No.: 234,394

[22] Filed: Aug. 19, 1988

[51] Int. Cl.$^5$ ............................................. G06K 19/00
[52] U.S. Cl. .................................. 235/487; 235/494; 235/495; 283/57; 283/58
[58] Field of Search ............... 235/495, 380, 494, 487; 283/57, 58

[56] References Cited

U.S. PATENT DOCUMENTS

| | | |
|---|---|---|
| 1,833,869 | 11/1931 | Cotton et al. |
| 2,264,889 | 12/1941 | Reynolds |
| 3,258,277 | 6/1966 | Schuster |
| 3,609,690 | 9/1971 | Nissman et al. |
| 3,665,162 | 5/1972 | Yamamoto et al. |
| 3,794,813 | 2/1974 | Spetz |
| 3,816,943 | 6/1974 | Henry ................................ 283/57 X |
| 3,829,133 | 8/1974 | Smagala-Romanoff ............. 283/58 |
| 4,117,975 | 10/1978 | Gunn .................................... 235/494 |
| 4,138,057 | 2/1979 | Atalla |
| 4,176,861 | 12/1979 | MacKiernan ......................... 283/58 |
| 4,177,377 | 12/1979 | Kuz ...................................... 235/494 |
| 4,184,148 | 2/1990 | Smagala-Romanoff |
| 4,268,715 | 5/1981 | Atalla |
| 4,283,599 | 8/1981 | Atalla |
| 4,329,576 | 5/1982 | Vander Meer et al. ............. 235/494 |
| 4,445,712 | 5/1984 | Smagala-Romanoff |
| 4,582,345 | 4/1986 | Kehoe .................................... 283/57 |
| 4,588,211 | 5/1986 | Greene .................................. 283/58 |
| 4,667,985 | 5/1987 | Leonard et al. |
| 4,675,669 | 6/1987 | Goldman ............................. 235/380 |
| 4,774,513 | 9/1988 | Lamothe-Bonnaval ............ 235/380 |

Primary Examiner—Harold I. Pitts
Attorney, Agent, or Firm—Price, Gess & Ubell

[57] ABSTRACT

A transactional instrument and method of producing the same is disclosed wherein a check can have a matrix array of subjectively coded symbols that are obscured from view, and which can be exposed in a particular manner for comparison with a dedicated ascertainable code to verify the transaction. Both the code and the addresses to the matrix array can be randomly generated, and removable opaque material can be used to obscure the coded symbols.

28 Claims, 4 Drawing Sheets

FINANCIAL INSTRUMENT VERIFICATION AND METHOD OF PRODUCTION

BACKGROUND OF THE INVENTION

1. Field of the Invention

A verification system for use at a transactional point to establish the identity of a bearer and method of producing the same is provided, and more particularly, the invention provides a transactional instrument such as a check having a matrix array of subjectively coded symbols, obscured from view, which can be exposed in a particular manner for comparison with a dedicated, ascertainable code to verify the transaction.

2. Description of the Prior Art

As society becomes increasingly mobile and business transactions are accomplished without the direct transfer of money, there has become an increasing demand and need to permit independent verification of a transaction in a relatively efficient and inexpensive manner. Such transactions can occur through the use of credit cards, shipping documents, financial instruments, and negotiable instruments. The problem of verifying the bearer of the instrument has been constant for a long period of time. Numerous different systems, methods and modifications of negotiable instruments have been suggested in the commercial and patent literature to solve this problem. For example, U.S. Pat. No. 1,833,869 discloses an identification system for cashing travelers checks by matching only a segmented section of a signature. U.S. Pat. No. 3,258,277 discloses a personalized checkbook where pictures of the holder are incorporated with the checkbook. U.S. Pat. No. 2,264,889 discloses a travelers checkbook which conceals the signature until the check is detached from the holder at the point of the transaction. U.S. Pat. No. 4,667,985 discloses a bank check with a wax coating adjacent columns of monetary value.

The prior art has also addressed the problem of identifying the proper user of a credit card through the provision of an identification number and a key number, and a subsequent comparison with a secret number which has been memorized by the user. An example of such a system is disclosed, for example, in U.S. Pat. Nos. 3,665,162, 3,794,813 and 3,609,690.

U.S. Pat. Nos. 4,184,148 and 4,445,712 disclose an identification system requiring a plurality of grids to be presented by the store owner to the customer with specific locations on the grids or positional codes being identified by the customer to determine an identification number. An independent register correlates the identification numbers with the particular customer, for example, through his Social Security number or other number, to verify the transaction.

Frequently the prior art has resorted to computers for providing an identification from a specific card and personal identification numbers (PIN) with an algorithm which permits a verification of the holder of the card. Numerous examples of such systems exist in the prior art, such as U.S. Pat. Nos. 4,138,057, 4,283,599 and 4,268,715. With the use of automatic teller machines (ATM) and the increased use of credit cards, there have been numerous proposals in the prior art to secure the identification in a transaction relating to the dispensing of money from automatic teller machines. Additionally, various security systems for gaining access to confidential material, or even access to a computer data bank, are known in the prior art, and usually involve encryption and decryption of information from a user which will somehow verify his identity. Frequently, access to a computer is necessary for implementation of an appropriate algorithm to decode or to identify and verify the user.

The economics of providing a credible, convenient and inexpensive verification system is important not only to the user, but also to the merchant or institution which requires the verification. A subscriber or merchant at the transaction point must be receptive to both the cost and inconvenience associated with any security verification system. This also includes the cost of purchasing hardware and software, such as terminals and processing programs, to implement any specific security system.

There is still a demand in the prior art to provide an acceptable level of security that will minimize the demands on both the user and the merchant or institution which depends upon the verification to complete a transaction.

SUMMARY OF THE INVENTION

The present invention provides a relatively inexpensive, efficient and convenient verification system for use at a transactional point, thereby permitting both the user and the recipient of the transactional instrument to immediately verify the authenticity of the bearer without requiring the accessing of ancillary registers, directories and data banks, and without accessing expensive computer hardware and software. The recipient of the transactional instrument need not be a subscriber, and the issuer of the transactional instrument can be assured of a high degree of security in honoring the transactional instrument upon presentation. The verification system provides a dedicated, ascertainable code which is unique to the entity involved in the transaction. The transactional instrument itself will have subjectively-coded symbols which are obscured from view in a matrix array with subjectively-coded visible addresses to that matrix array. The user will select predetermined addresses for identifying the coded symbols which will permit the recipient to make a comparison with the dedicated, ascertainable code for verifying the transaction.

The present invention can take the form of a unit of negotiable instrument forms that can include printed information designating the identification of a drawee and drawer account, with space on the negotiable instrument for recording a monetary amount of a financial transaction to a bearer. Each of the forms will have a unique code of indicia, including a set of subjectively-coded visible addresses which are significantly greater than the elements of the indicia code. The instrument will also have a randomly-generated set of indicia elements, including the predetermined unique code, with each element being individually juxtapositioned adjacent a corresponding address. These indicia elements will be obscured from view on the instrument form. Each of the addresses and indicia elements can be randomly generated and printed on each form so as to be different from every other form in the unit of negotiable instrument forms.

The user at the transaction point will designate specific addresses corresponding to a predetermined identification code unique to the user, and thereby will selectively remove the obscuring feature on the negotiable instrument form to reveal correspondence between the designated addresses and the indicia elements representative of that unique code. The unique code can incorporate, for example, portions of another identifying number such as the ATM card number of the user or a randomly-assigned number which can be provided to a user with each packet of negotiable instrument forms.

The present invention includes a method of producing the negotiable instrument.

The features of the present invention which are believed to be novel are set forth in the appended claims. The present invention, both as to its organization and manner of operation, together with further objects and advantages thereof, may be best understood by reference to the following description taken in conjunction with the accompanying drawings.

DETAILED DESCRIPTION OF THE PREFERRED EMBODIMENTS

The following description is provided to enable any person in the financial and printing industry to make and use the invention, and sets forth the best modes contemplated by the inventor of carrying out his invention. Various modifications, however, will remain readily apparent to those skilled in the above art, since the generic principles of the present invention have been defined herein specifically to provide a relatively economical and easily-manufactured transactional instrument which can be verified at the point of transaction.

Figure 1:
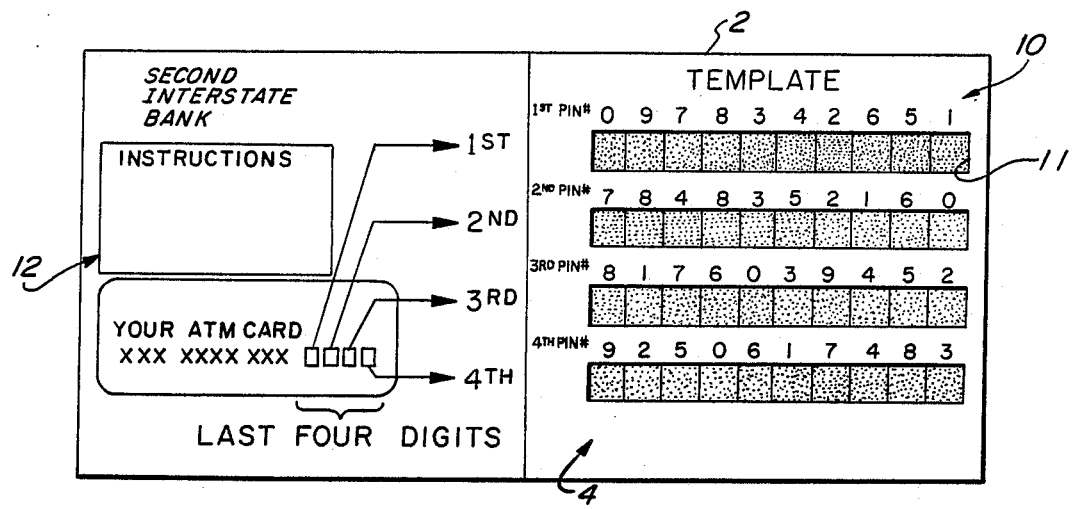
FIG. 1 is a schematic plan view of the back of a transactional instrument such as a check having an overlay template.
Figure 4:
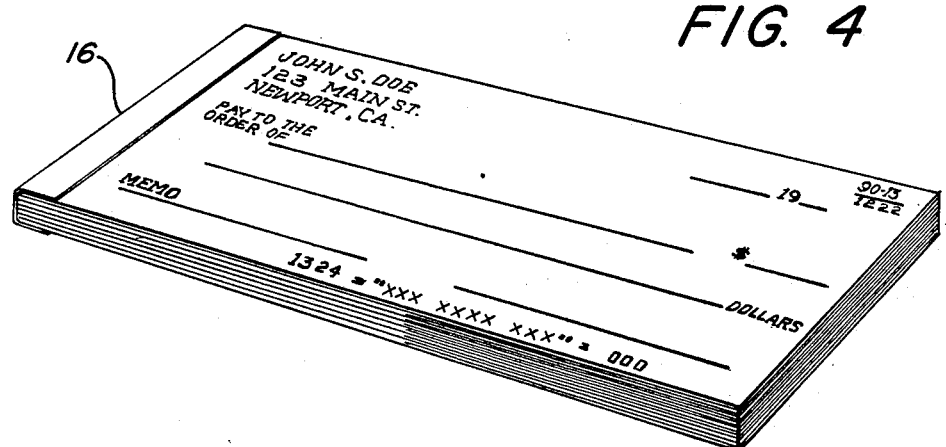
FIG. 4 is a perspective view of a unit of negotiable instruments.

Referring to FIG. 1, a financial instrument such as a check 2 is disclosed on its back side. As can be readily appreciated, the present invention is applicable to a number of transactional instruments, and a check is only one form of negotiable instrument that can receive the present invention. A check, however, is an important instrument that can utilize the advantages of the present invention, since the problem of verifying the bearer of a check has been constant for a long period of time, and checks are frequently utilized at commercial transactional points. It should be recognized, however, that other negotiable instruments, such as shipping documents, financial instruments, etc., can also benefit from the present invention. The front of the check can carry the normal indicia identifying the name and address of the bearer, the conventional "pay to the order of" terminology, and can provide space for date, the amount of money and a signature line, along with the appropriate identification of the drawee and the drawer's account number. Generally, a series of negotiable instruments can be assembled and united into a booklet form for dispensing by the drawee bank to its customer, as shown in FIG. 4.

Figure 2:
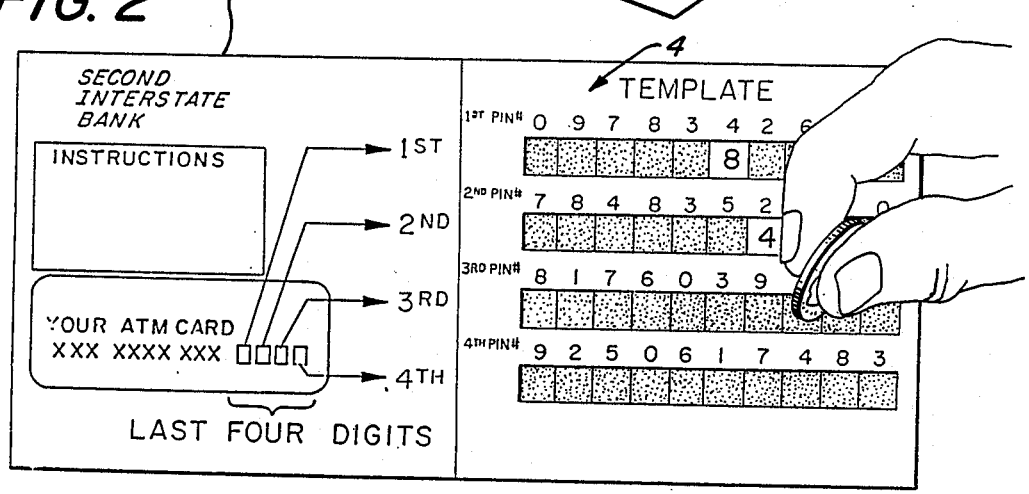
FIG. 2 is a schematic plan view with a user removing obscuring material.
Figure 3:
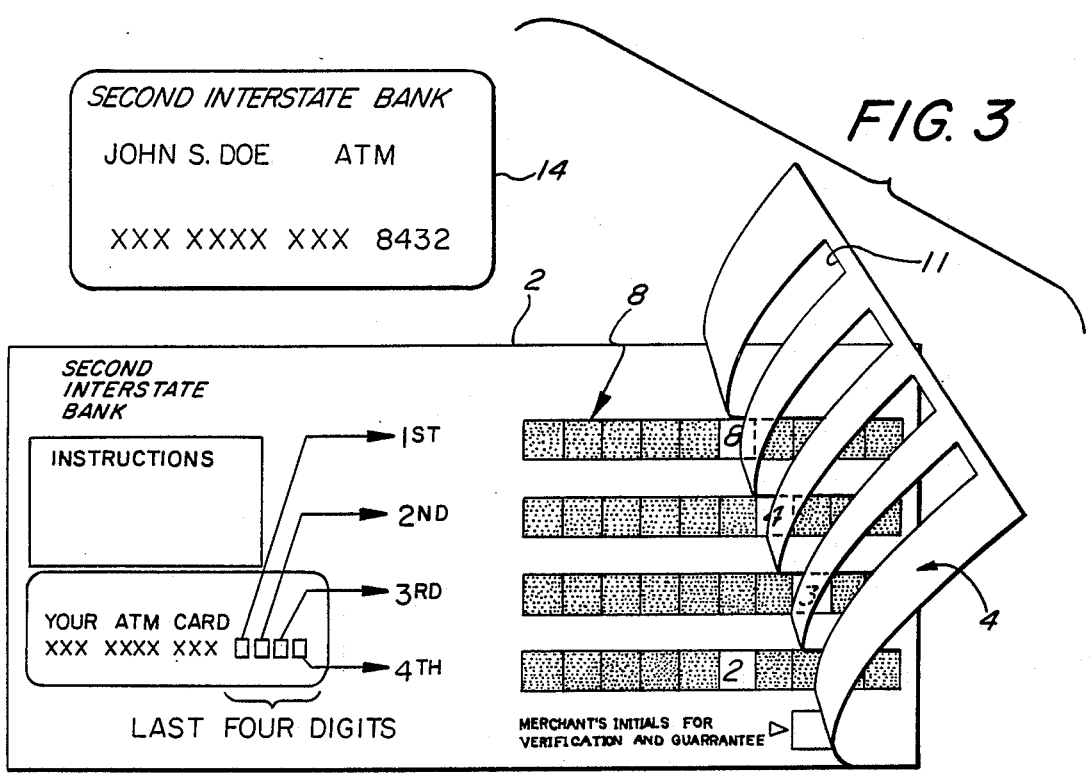
FIG. 3 is a schematic plan view of the check with the template being removed for destruction.

The negotiable instrument which in FIGS. 1 and 3 is the check 2 can have on its rear surface a removable template 4 with a series of open apertures or windows 6 that provide access by the user to predetermine portions 3 on the rear of the check. These portions are coated with a removable nontoxic material 8 such as a scratch-off consumer latex material sold, for example, by Webb Craft Technology, Inc. of North Brunswick, N.J. When the user removes the opaque material 8 pursuant to the printed instructions 12 on the check 2, the material is permanently exhausted by the removal step. The purpose of this removable material 8 is to obscure certain predetermined indicia elements that have been previously printed on the rear of the check 2. These indicia elements constitute a predetermined unique code that has been randomly generated for each individual check. Thus, these indicia elements are randomly generated and printed on each check form so as to be different from every other check form. As a result of this random generation and application on an individual basis to each of the check forms, increased security occurs if a theft of a unit of negotiable instruments 16 such as a complete booklet from a user occurs and prevents a person from decoding the system by comparison with other checks. The indicia can commonly be an alphanumeric system in its most common utilization. Other forms of indicia, however, can be utilized, as can be readily appreciated by a person of skill in this field. Reference can be made to FIG. 2 to disclose, for example, a particular code that has been rendered visible by scratching off the removable coating 8. FIG. 3 discloses the check 2 with a template 4 being removed, after the unique code has been verified by the user. Obviously, the check 2 should, at the beginning of the verification procedure, have a complete coating 8 covering the indicia.

The template 4 also includes a set of subjectively-coded visible addresses 10 adjacent each aperture 11, which again can be of an alphanumeric configuration. These addresses 10 are preferably significantly greater than the elements of the indicia code, thereby permitting each of the elements of the indicia code on a particular row or aperture to correspond to more than one address.

As disclosed in FIG. 1, four separate rows are provided. Each one of the rows corresponds to one element of the indicia code. Instructions 12 can be provided on the template 4 or on the rear of the check 2 to inform the parties to the transaction of the manner in which the verification system works.

In the preferred embodiment shown in FIG. 3, the user can use the number on his automatic teller machine (ATM) card 14 to permit a matching or correspondence for verification of the transaction. The user is initially provided a personal identification number (PIN) which is unique to the bearer. This personal identification number or PIN number is disclosed in the preferred embodiment as a four-digit number and is usually provided through the bank. The user, at the point of transaction, then selectively and permanently removes the coating material 8 immediately beneath each of the digits of the personal identification number. These PIN numbers are contained in the group of addresses 10 that are printed on the template 4. Thus, in the embodiment disclosed in FIGS. 1 and 2, the personal identification number was 2147. The user then removes the obscuring removable material 8 underneath, respectively, the digit 2 on the first row, the digit 1 on the second row, the digit 4 on the third row, and the digit 7 on the fourth row. The corresponding code that is then made visible should represent the last four digits on the ATM card 14. The user also makes available his ATM card to prove that he, in fact, is the legitimate bearer of the negotiable instrument. By providing a removable template 4 for each check with subjectively and randomly-generated addresses 10 and instructing the user to destroy the template 4 after use, increased security can be achieved to prevent decoding the verification system of the present invention.

Figure 5:
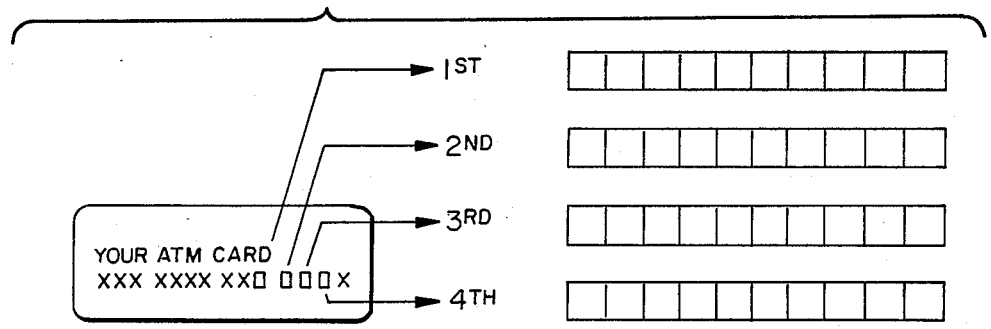
FIG. 5 is a schematic illustration of another template in a unit of negotiable instruments.

If the negotiable instruments are stolen along with the ATM card, the false bearer still could not cash the checks without having further access to the individual PIN number that has been memorized or securely retained by the drawee of the instruments. Even if the thief destroys a number of checks by removing all of the obscuring material 8, he will not be able to ascertain the personal identification number of the user, since each check has a subjectively-coded visible address which is significantly greater than the elements of the unique code of the indicia, such as the last four digits of the ATM card. As can be readily appreciated, since the negotiable instruments are subjectively printed, it is also possible to vary which set of the four digits on the ATM card will be used as the verification digits on each individual check. Thus, the digits can progressively or randomly change on each of the checks. The advantages of this further randomization is to create a higher source of numbers to increase the statistical odds against discovery of the unique PIN number. As can be seen in FIG. 5, a subsequent template can require verification of the next check in order by reference to a different set of digits of the ATM card 14, such as the next set of four digits.

Figure 6:
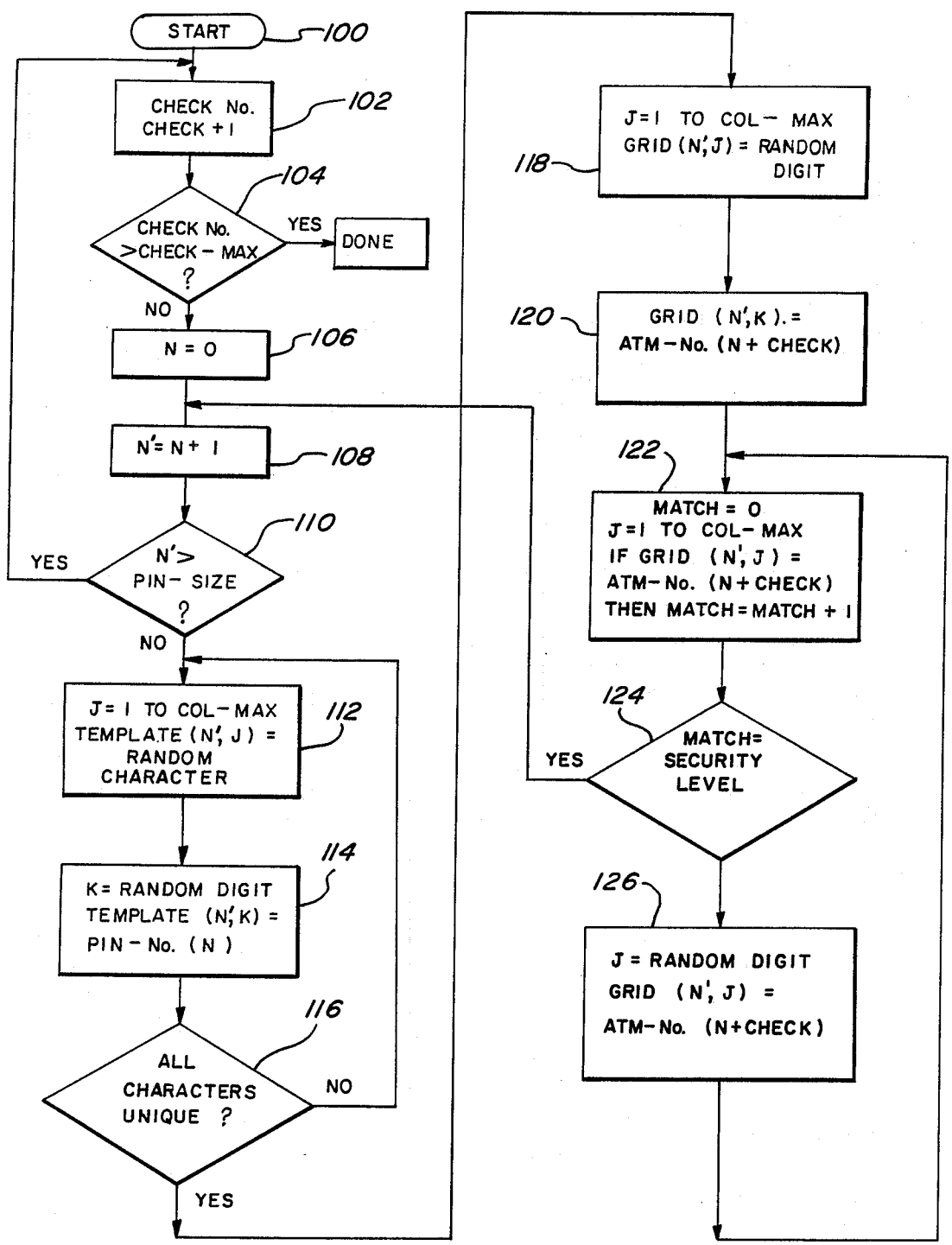
FIG. 6 discloses a flow chart algorithm for encrypting checks.

Referring to FIG. 6, a flow chart of the encryption portion of a computer program for printing randomized encrypted checks and templates is disclosed.

The following definitions are used in the check encryption algorithm:

PIN-NUMBER: The customer pin number. An alpha-numeric field used as the key to encode and decode checks. PIN-SIZE=from 4 to 8 characters.

CONTROL-NUMBER: A number of PIN-SIZE length. This is the number that is revealed on the CONTROL-GRID by properly scratching off the corresponding pin characters of the TEMPLATE. In the "DEDICATED CARD APPROACH" this number is randomly assigned to each check, and is printed on a card given to the customer with each packet of checks. In the "ATM APPROACH" this number is derived from the customer ATM number by selecting PIN-SIZE fields beginning on the left-hand side and sliding right one digit for each subsequent check. Thus the maximum number of checks that can be encoded using this approach depends on both PIN-SIZE and COL-MAX.

TEMPLATE: A matrix of digits printed on the face of each check and on which the pin characters are to be scratched off. Each row of TEMPLATE corresponds to one pin character. The number of columns, COL-MAX, is arbitrary.

CONTROL-GRID: A matrix of digits printed on the hidden underside of each check, which, when properly exposed by scratching off the correct characters of the TEMPLATE, divulges the encoded CONTROL-NUMBER. It is of the same size as the TEMPLATE.

SECURITY-LEVEL: An input numeric parameter from 1 to 4 which specifies how many occurrences of the matching CONTROL-NUMBER digit are to be placed in the CONTROL-GRID.

The initialization of the program at step 100 includes presetting of the PIN number of the user, the maximum (Check-Max) number of check units to be printed, and a security level based on the number of times a PIN number digit will repeat in a given row. At step 102, the check number is set at check plus one where "check" was initialized at zero during START. A decision is made at step 104 to determine if the check number is greater than Check-Max. If the answer is "yes," the encryption process is completed for that unit of checks. If the answer is "No," a counter is initialized at step 106 to zero for a new row N of the next check. At step 108, the row N' is set at the previous value of the counter plus one, and each cycle of encryption will add a value of 1 to N' until N' is greater than the PIN size as shown at decimal step 110. If decision step 110 is "Yes," the program returns to step 102 to repeat for the next check in the check units. If, however, the decision step 110 is "No," then the row N' is generated with random characters of an alphanumeric configuration to provide a row for the template in step 112.

In step 114, the N'th character of the PIN number (that is, the corresponding character to that particular template row) is inserted in a random manner into any position or column of row N' by replacing a randomly-generated character.

The program then verifies that all of the alphanumeric characters that have been randomly generated are unique, that is, there is no duplication of alphanumeric characters in step 116. If the answer is "No," the program returns to step 112 and proceeds until the characters are unique. The program then proceeds from a row N' of the template to determine a corresponding row of the grid on the check, if an affirmative decision is made at step 116.

In step 118, the row N' of the GRID on the check is filled with random digits, since the ATM card is generally provided with only numerals. In step 120, a digit of the verifying segment of numbers in the ATM card, e.g., the last four numbers, is inserted in the row N' of the GRID to match the PIN number of the template, and replaces a randomly-generated number in the row N'.

In step 122, the program compares the number of times an ATM number appears in the row of the GRID to the preset security level determined at START. The security level is based on the ability to mask the correlation between PIN number and ATM number during any unauthorized decryption attempt by a third party. An increase in the security level would statistically increase the number of matches between a template number and the ATM number for any row up to a predetermined number derived from the total number of digits available. If the security level is reached at step 124, the program returns to step 108. However, if the security level is not matched, the program proceeds to step 126, where extra matching characters are randomly inserted, and the program loops back to step 122.

Figure 7:
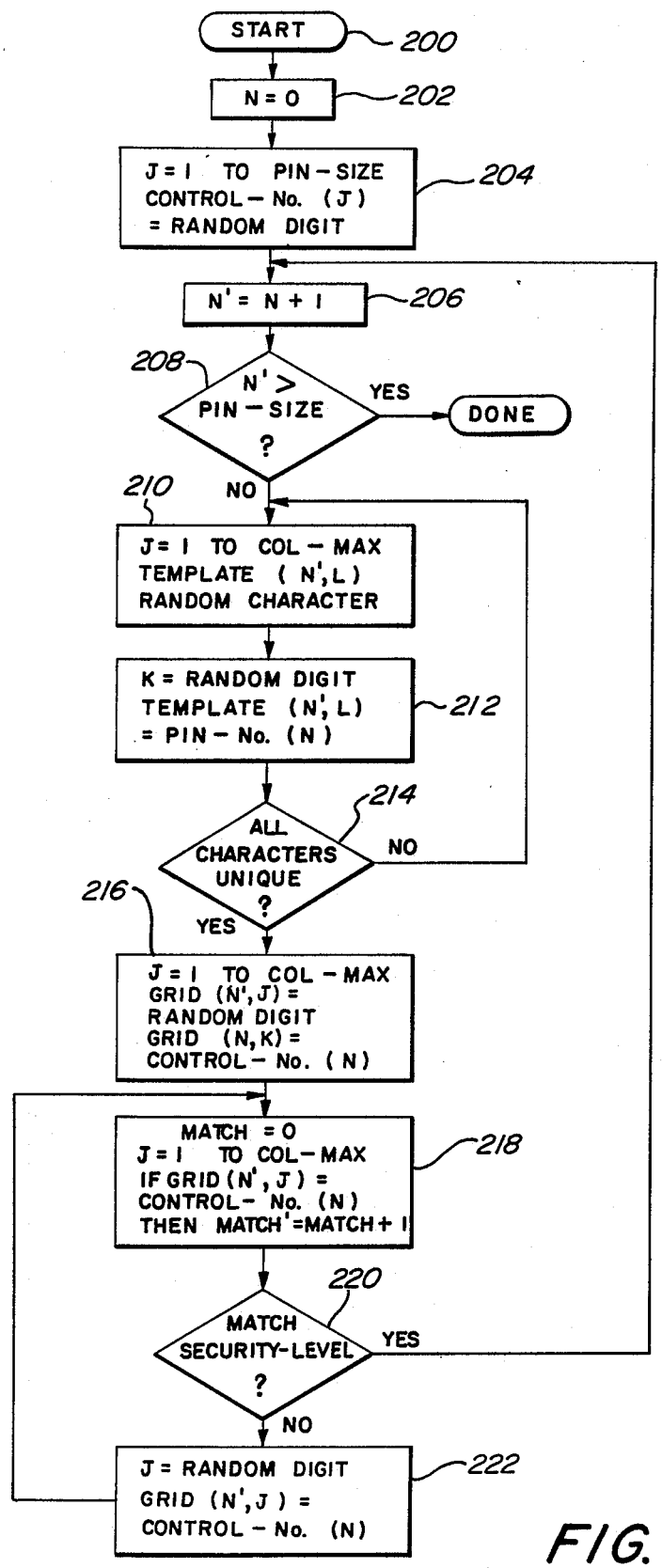
FIG. 7 discloses a modified flow chart system for encrypting checks.

An alternative embodiment of the present invention is disclosed with regard to FIG. 7. Instead of an ATM card being utilized to verify the numbers revealed when a portion of the coating latex material 8 is removed from the rear of the check, a dedicated card is used which is issued with each unit of negotiable instruments. The disposable card can have a group of separate identification numbers or control numbers for each check in a unit of negotiable instruments.

Referring to FIG. 7, after initialization of the program at step 200, a counter is initialized at step 202 to 0 for a new row N of the check. At step 204, a random generation of a control number for the specific check occurs. At step 206, the row N' is set at the previous value of the counter, plus 1, and each cycle of encryption will add a value of 1 to N' until N' is greater than the PIN size, as shown at step 208. If the decision at step 208 is "Yes," the program encryption is finished. If the decision at step 208 is "No," then the row N' is generated with random characters of an alphanumeric configuration to provide a row for the template in step 210. In step 212, the N'th character of the PIN number (that is, the corresponding character to that of the particular template row) is inserted in a random manner into any position or column of row N' by replacing a randomly-generated character. At step 214, the computer program then verifies that all the alphanumeric characters that have been randomly generated are unique, that is, that there is no duplication of alphanumeric characters in step 214. If the answer is "No," the program returns to step 210 and proceeds until the characters are unique. The program then proceeds from a row N' of the template to determine a corresponding row of the grid on the check, if an affirmative decision is made at step 214. In step 216, the row N' of the grid is filled with random digits, and the control number that was previously filled with a random digit is then consulted so that the N'th character of the control number is inserted in a column matching the PIN on the template.

In step 218, the computer program compares the number of times the control number digit appears on the row of the grid to the preset security level determined at the initialization. The security level is based upon the ability to mask the correlation between the control number and the ATM number during any unauthorized decryption attempt by a third party. Since the disposable card approach can utilize randomly-generated control numbers, it is clear that a high level of security is created. If the security level is reached at step 220, the program returns to step 206 and again repeats for the next row.

Additional variations of the present invention are also capable of being accomplished. For example, a universal template can be provided for each unit of negotiable instruments, rather than a separate removable template for each check. The universal template would then be reused by placing it over each of the checks, and separate portions of apertures on the universal template could be applicable to each check.

An alternative embodiment can also have the check printed with an acid layer capable of reaction for the development of visible indicia on the check. A microencapsulated template having an appropriate liquid for reaction with the acid layer in the check can be provided to overlay the specific check. The template would carry the addresses, and the crushing or rupturing of the microencapsulated fluid carried in the template adjacent a specific address would enable the development of the indicia which is represented by the microencapsulization on the check. In effect, the ATM number could actually be developed in the matrices of the check paper. Examples of compatible combinations of reactant chemicals and their interface with check paper can be found in U.S. Pat. No. 4,029,012.

The template itself can be transparent and not require apertures. The microencapsulated material can be carried on the bottom of the transparent template with alignment indicia for positioning on the check, and pressure by the user can break the capsules for development.

Figure 8:
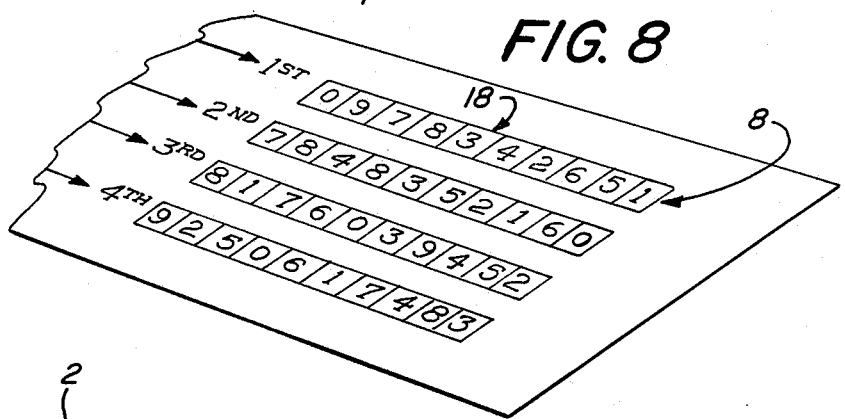
FIG. 8 is a partial perspective view of a check with obscuring material printed with addresses.

An alternative embodiment of the present invention can eliminate the template, as shown in FIG. 8. In this embodiment, the latex coating material 8 has overprinted address numbers 18 on top of rows of the latex material. The user simply removes the latex material corresponding to the printed address location number to reveal the PIN number.

The particular desirability of each specific embodiment of the invention depends upon the level of security demanded for the transactional instrument. When individual templates are removed and disposed of, there is less likelihood of breaking a particular code to determine the PIN number or dedicated control number of the user. The system using the largest number of variable numbers or letters of the alphabet in combinations will create a larger barrier to any particular decoding by a thief or a dishonest storekeeper for discovering the user's PIN number.

As can be readily appreciated, other modifications are possible within the scope of the present invention and will become readily apparent to a person skilled in this field once given the teachings of the present invention. Accordingly, the present invention should be determined solely from the following claims.

What is claimed is:

1. A verification system for use at a transactional point comprising:
    means for providing a dedicated ascertainable code unique to the entity involved in the transaction;
    a transactional instrument having subjectively coded symbols that are obscured from view in a matrix array with subjectively coded visible addresses to the matrix array, and
    means for selecting predetermined addresses for identifying the coded symbols for comparison with the dedicated ascertainable code to verify the transaction.

2. The invention of claim 1 wherein the means for providing a dedicated ascertainable code includes a card member with a permanently affixed code.

3. The invention of claim 1 wherein the transactional instrument is a bank check having information identifying a bank and a customer thereof.

4. The invention of claim 1 wherein the transactional instrument has coded symbols and addresses that are randomly generated as printed indicia on the instrument.

5. The invention of claim 1 wherein the coded symbols are coated with a removable opaque material that is permanently exhausted in a removal step by a user.

6. The invention of claim 1 further including a removable template attached to the transactional instrument wherein the addresses are printed on a removable template.

7. The invention of claim 1 wherein the coded symbols are printed on the transactional instrument bank form.

8. The invention of claim 1 wherein the means for providing a dedicated ascertainable code includes a member having a plurality of codes, each code for use with a different transactional instrument.

9. The invention of claim 1 further including a template having multiple sets of addresses, each set of addresses applicable with a different transactional instrument.

10. The invention of claim 5 wherein the visible addresses are printed directly on the removable opaque material.

11. In a negotiable instrument form including printed information thereon designating identification of the bank and instrument account and having space on the negotiable instrument form for recording a monetary amount of a financial transaction, the improvement comprising:
  means for identifying a unique code of indicia including a set of subjectively coded visible addresses significantly greater than the elements of the indicia code;
  means for providing a randomly generated set of indicia elements including the predetermined unique code, each element individually juxtapositioned adjacent a corresponding address, and
  means for obscuring the indicia elements from view, wherein the user at the transaction point designates specific addresses corresponding to a predetermined identification code and selectively removes the obscuring means to reveal a correspondence between the designated addresses and the indicia elements representative of the unique code.

12. The invention of claim 11 wherein the addresses and indicia elements are randomly generated as printed indicia on the form.

13. The invention of claim 11 wherein the indicia elements are coated with a removable opaque material that is permanently exhausted by the removal step.

14. The invention of claim 11 wherein the addresses are printed on a removable template attached to the form.

15. The invention of claim 13 wherein the indicia elements are printed on the negotiable instrument bank form.

16. The invention of claim 15 wherein the addresses are printed on a removable template attached to the form.

17. The invention of claim 15 wherein the addresses are printed directly on the removable opaque material.

18. The invention of claim 17 wherein the code includes a plurality of elements, and instructions are provided on the bank form to identify groups of addresses corresponding to each element of the code.

19. A unit of negotiable instrument forms including printed information thereon designating identification of a drawee and drawer account and having space on the negotiable instrument for recording a monetary amount of a financial transaction to a bearer, comprising:
  a plurality of negotiable instrument forms, each having means for identifying a unique code of a specific combination of indicia elements, including a set of subjectively coded visible addresses significantly greater in number than the elements of the indicia code;
  means for providing a randomly generated set of indicia elements including the elements defining the predetermined unique code, each element individually juxtapositioned adjacent a corresponding address, and
  means for obscuring all of the indicia elements from view, the addresses and indicia elements are randomly generated and printed on each form so as to be different from every other form in the unit, wherein the user at the transaction point designates specific addresses corresponding to a predetermined identification code and selectively removes the obscuring means to reveal a correspondence between the designated addresses and the indicia elements representative of the unique code.

20. The invention of claim 19 wherein the means for providing a unique code includes an automatic teller card with a numeric code.

21. The invention of claim 19 wherein the means for providing a unique code includes a dedicated card member having a plurality of control numbers, each control number corresponding to a form in the unit.

22. The invention of claim 19 wherein the code elements are printed on the form and coated with a removable opaque material that is permanently exhausted in a removal step by a user.

23. The invention of claim 22 further including a removable template attached to each form with visible addresses provided on the form.

24. The invention of claim 22 wherein the visible addresses are printed directly on the removable opaque material.

25. The invention of claim 23 wherein each template has apertures with the visible addresses positioned adjacent the apertures, the apertures being positioned to provide access to the code elements.

26. A method of providing a transactional instrument capable of verification of the bearer at the transactional point, comprising:
  determining a dedicated ascertainable code unique to the bearer involved in the transaction;
  randomly generating a series of subjectively coded symbols;
  substituting, where required, the dedicated ascertainable code in the series of subjectively coded symbols;
  providing a visible representation of the coded symbols and dedicated code in a random format on the transactional instrument;
  determining a personal identification code applicable to the transactional instrument;
  randomly generating a series of address numbers for identifying the coded symbols;
  substituting, where required, the personal identification code in the series of address numbers;
  obscuring the coded symbols and dedicated code on the transactional instrument from the view of the user, and
  providing the address numbers which include the personal identification code adjacent the obscured coded symbols.

27. The method of claim 26 further including printing the dedicated code and coded symbols on the transactional instrument and coating the transactional instrument with a removable opaque material.

28. The method of claim 27 further including providing a removable template on the transactional instrument with the series of address numbers aligned with and adjacent to the coded symbols.

* * * * *